United States Patent
Kono et al.

(10) Patent No.: US 7,218,676 B2
(45) Date of Patent: May 15, 2007

(54) METHOD AND A DECODER FOR DECODING MPEG VIDEO

(75) Inventors: Tadayoshi Kono, Kawasaki (JP); Mitsuhiko Ohta, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 563 days.

(21) Appl. No.: 09/747,957

(22) Filed: Dec. 27, 2000

(65) Prior Publication Data
US 2001/0005398 A1 Jun. 28, 2001

(30) Foreign Application Priority Data
Dec. 28, 1999 (JP) .................................. 11-375672

(51) Int. Cl.
H04B 1/66 (2006.01)

(52) U.S. Cl. ................................. 375/240.25

(58) Field of Classification Search ........... 375/240.25, 375/240.01, 240.15, 240.21; 382/232, 233; 345/536, 537; 365/230.03; 348/581, 718; 707/102; H04B 1/66
See application file for complete search history.

(56) References Cited

U.S. PATENT DOCUMENTS

| | | | | |
|---|---|---|---|---|
| 5,461,679 A * | 10/1995 | Normile et al. | ............. | 382/304 |
| 5,581,310 A * | 12/1996 | Vinekar et al. | ............. | 348/718 |
| 5,699,117 A * | 12/1997 | Uramoto et al. | ......... | 348/390.1 |
| 5,752,266 A * | 5/1998 | Miyawaki et al. | .......... | 711/158 |
| 5,881,016 A * | 3/1999 | Kenkare et al. | ....... | 365/230.03 |
| 5,896,140 A * | 4/1999 | O'Sullivan | .................. | 345/536 |
| 6,181,353 B1 * | 1/2001 | Kurisu | ........................ | 345/537 |
| 6,181,746 B1 * | 1/2001 | Hoshi | ..................... | 375/240.25 |
| 6,272,497 B1 * | 8/2001 | Mendenhall et al. | ....... | 707/102 |
| 6,320,909 B1 * | 11/2001 | Takabatake et al. | ... | 375/240.25 |
| 6,408,100 B2 * | 6/2002 | Miyawaki et al. | .......... | 382/233 |
| 6,424,381 B1 * | 7/2002 | Mendenhall et al. | ....... | 348/581 |
| 6,442,206 B1 * | 8/2002 | Hrusecky | ............... | 375/240.21 |
| 6,570,626 B1 * | 5/2003 | Mendenhall et al. | ....... | 348/569 |

FOREIGN PATENT DOCUMENTS

| | | |
|---|---|---|
| JP | 07 074647 | 3/1995 |
| JP | 09 319349 | 12/1997 |
| JP | 10 093917 | 4/1998 |
| JP | 2000-232649 | 8/2000 |

OTHER PUBLICATIONS

Partial English Translation of Japanese Office Action mailed Nov. 28, 2006.

* cited by examiner

Primary Examiner—Tung Vo
(74) Attorney, Agent, or Firm—Arent Fox LLP (57) ABSTRACT

A decoded picture and parameters of a sequence layer, a GOP layer and a picture layer respectively for displaying the decoded picture are stored as a set in each of picture banks and parameter banks of a frame memory. Parameters of each layer stored as a set with a picture decoded immediately before are read out. Parameters attached to a picture to be decoded are decoded overwritten. Thus, the parameters of each layer stored as a set with the picture to be decoded are generated.

8 Claims, 10 Drawing Sheets

FIG.1

| LAYER | PARAMETERS | CONTENT OF PARAMETERS |
|---|---|---|
| SEQUENCE | horizontal_size_value<br>vertical_size_value<br>aspect_ratio_information<br>frame_rate_code | HORIZONTAL SIZE OF IMAGE<br>VERTICAL SIZE OF IMAGE<br>ASPECT RATIO OF PIXEL<br>NTSC DISPLAY OR PAL DISPLAY |
| | display_horizontal_size<br>display_vertical_size | HORIZONTAL DISPLAY SIZE OF DECODED IMAGE<br>VERTICAL DISPLAY SIZE OF DECODED IMAGE<br>(WHEN THERE IS NO PAN-SCAN PARAMETER,<br>USUALLY horizontal_size_value AND<br>vertical_size_value ARE THE SAME) |
| GOP | closed_gop<br>broken_link | IT IS POSSIBLE TO DISPLAY HEADER B PICTURE OF GOP<br>IT IS NOT POSSIBLE TO DISPLAY HEADER B PICTURE OF GOP |
| PICTURE | top_field_first<br>repeat_first_field | DISPLAY STARTING FROM FIRST-FIELD PICTURE<br>DISPLAY FIRST-FIELD PICTURE REPEATEDLY |
| | frame_centre_horizontal_offset<br>frame_centre_vertical_offset | PAN-SCAN PARAMETER<br>(CUT OUT A PART OF IMAGE IN SQUARE, AND<br>DISPLAY BY ENLARGING SIZES TO DISPLAY<br>SIZES INDICATED BY display_horizontal_size<br>AND display_vertical_size) |

METHOD AND A DECODER FOR DECODING MPEG VIDEO

FIELD OF THE INVENTION

The present invention relates in general to a method and a decoder for decoding bit stream data of a dynamic image that has been decoded according to the MPEG (Moving Picture Experts Group) standard.

BACKGROUND OF THE INVENTION

The MPEG standard is an international standard relating to an image compression. A dynamic image coding technique and a dynamic image decoding technique based on the MPEG standard are the techniques that are unavoidable in the recent multimedia environment. Thus, there have been developed many dynamic image coding apparatuses and dynamic image decoding apparatuses that employ the MPEG standard.

In the MPEG standard, three types of pictures are used for achieving high-efficiency coding. These three types are, intra-coded picture (hereinafter to be referred to as an I picture), a predictive-coded picture (hereinafter to be referred to as P picture), and a bidirectionally predictive-coded picture (hereinafter to be referred to as B picture).

The I picture is coded based on only the picture information of its own, that is, without using other picture information. As the I picture can be coded independent of other pictures, the I picture is used as an access point at the time of a random access. Therefore, other picture information is not necessary for decoding the I picture.

The P picture is coded by using a past I picture or a past P picture as a reference picture. Therefore, the information of a past I picture is necessary for decoding the P picture.

The B picture is coded by using past and future I pictures or past and future P pictures as reference pictures. Therefore, the information of past and future I pictures or P pictures are necessary for decoding the B picture.

A hierarchical coding system is employed in the MPEG standard. In other words, a video sequence consists of six hierarchical layers in total. They are a sequence layer, a group-of-picture layer (hereinafter to be referred to as GOP layer), a picture layer, a slice layer, a macro block layer (hereinafter to be referred to as MB layer), and a block layer, in the order starting from a highest-order layer. The four high-order layers starting from the sequence layer to the slice layer are added with a start code respectively to show the start of each layer.

Following each start code, parameters are coded for each layer. For example, the sequence layer has a sequence header code (SHC) at the beginning, and then has, as parameters, a horizontal size value, a vertical size value, aspect ratio information, etc. which are superimposed in this order.

Figure 1:
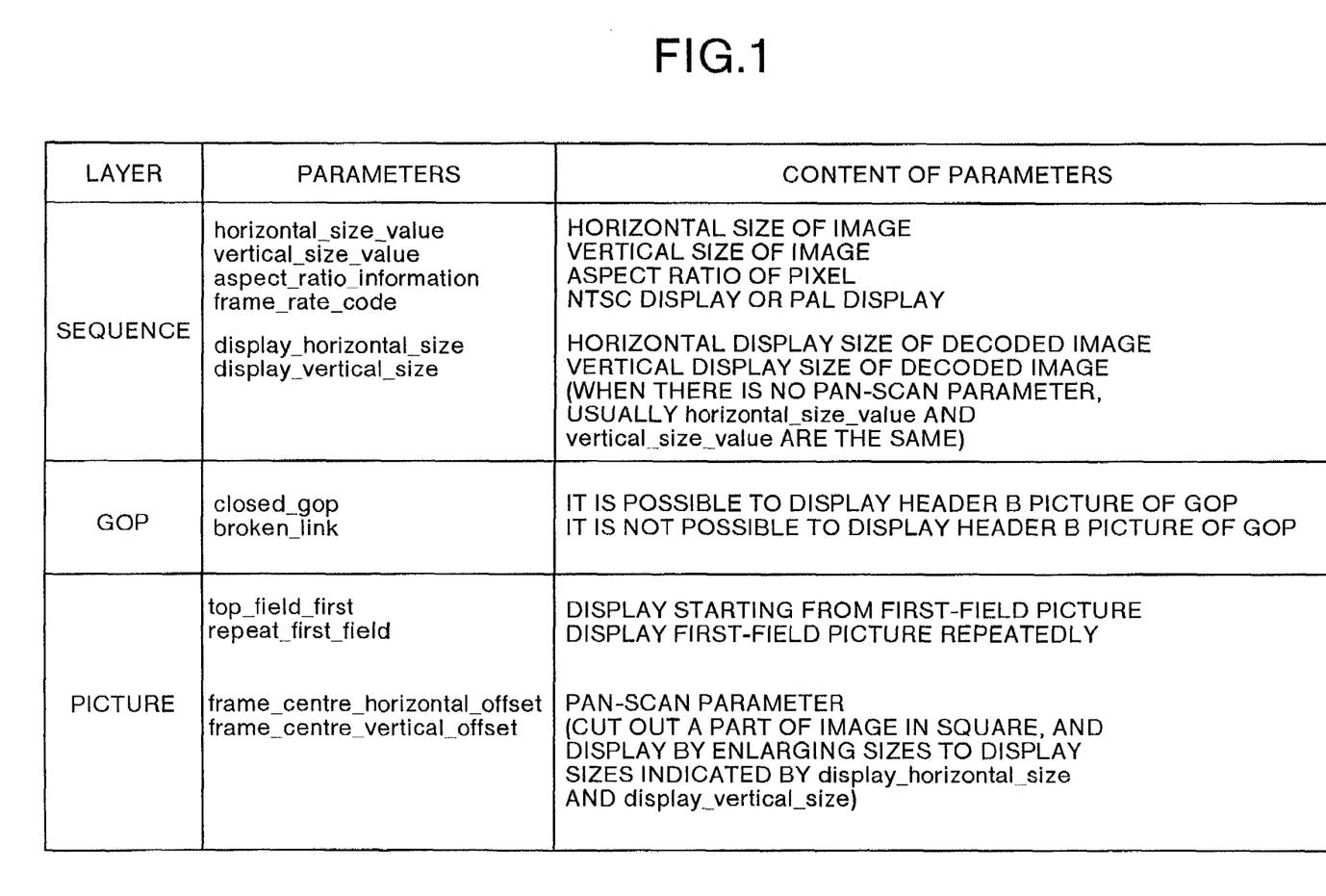
FIG. 1 is a table that shows a part of parameters of each layer of the MPEG standard.

The table in FIG. 1 shows a part of parameters for each layer of the MPEG standard. In the case of the sequence layer, the horizontal size value and the vertical size value are parameters that express the sizes of an image in the horizontal direction and the vertical direction respectively. In other words, they are the parameters that express numbers of pixels in the horizontal direction and the vertical direction respectively. The aspect ratio information is a parameter that expresses the aspect ratio of the pixels. In addition to these parameters, the sequence layer also has other parameters, such as a display horizontal size and display vertical size that express the display sizes of a decoded image in the horizontal direction and in the vertical direction respectively.

The GOP layer has two parameters. They are, a closed group of picture (closed gop) that expresses that it is possible to display a B picture at the head of the GOP, and a broken link that expresses that it is not possible to display a B picture at the head of the GOP.

The picture layer has four parameters. First two parameters are a top field first that expresses that a display is made starting from a picture of a first field, and a repeat first field that expresses that a picture in the first field is displayed repeatedly. Other two parameters are a frame center horizontal offset and a frame center vertical offset that are pan-scan parameters.

A conventional MPEG video decoder generally stores these parameters of each layer into a register inside the decoder, and refers to these parameters at the time of making a display. The structure of the conventional MPEG video decoder will be explained below.

Figure 2:
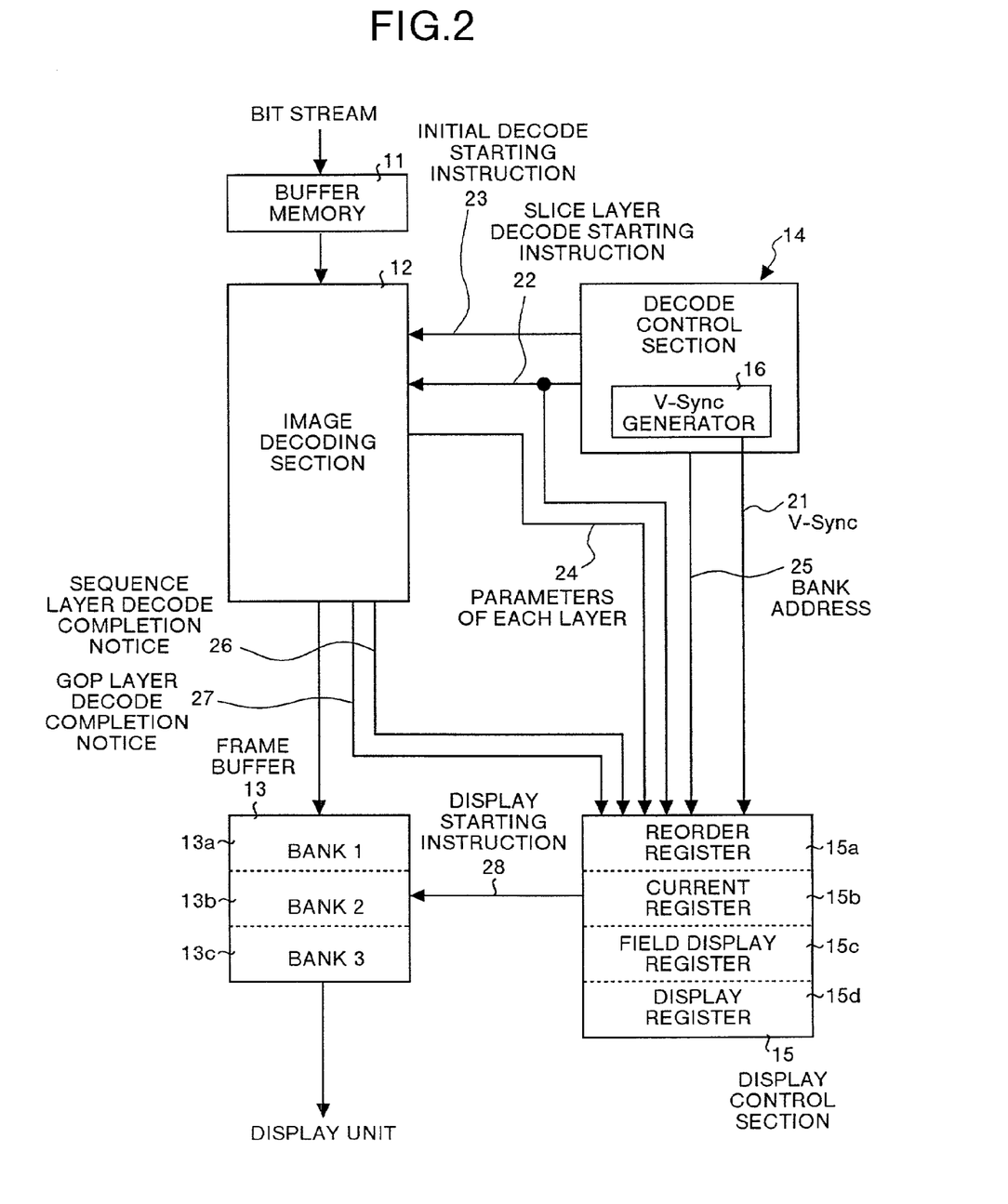
FIG. 2 is a block diagram that shows a structure of a conventional MPEG video decoder.

FIG. 2 is a block diagram that shows a structure of the conventional MPEG video decoder. This MPEG video decoder consists of a buffer memory 11, an image decoding section 12, a frame buffer 13, a decode control section 14, and a display control section 15. The buffer memory 11 stores an MPEG bit stream that has been transmitted from a transmission path or a storing medium. The image decoding section 12 decodes a bit stream that has been transmitted from the buffer memory 11, and generates a picture.

The frame buffer 13 stores a picture generated by the image decoding section 12. The frame buffer 13 has a capacity for storing three pictures. The frame buffer 13 is divided into three areas which respectively store one picture. Each area is called a bank. In other words, the frame buffer 13 has three banks, a first bank 13a, a second bank 13b and a third bank 13c. Each of the banks 13a, 13b and 13c has its own address (i.e., bank address).

The decode control section 14 incorporates a vertical synchronization signal generator 16 that generates a vertical synchronization signal (V-Sync) 21. The decode control section 14 issues a slice layer decode starting instruction 22 to the image decoding section 12 and the display control section 15. The slice layer decode starting instruction 22 is synchronous with the vertical synchronization signal (V-Sync) 21. The cycle of issuing the slice layer decode starting instruction 22 is basically once per every two field time, that is, once per one frame time. This cycle is for matching the decoding speed with the display speed, as the display speed is at the rate of displaying one picture during one frame time. When the capacity of the buffer memory 11 has satisfied a predetermined condition at the time of a cold starting, the decode control section 14 issues an initial decode starting instruction 23. The timing of issuing the initial decode starting instruction 23 is not related to the vertical synchronization signal (V-Sync) 21.

The display control section 15 incorporates registers for storing parameters 24 of each layer decoded by the image decoding section 12 and a bank address 25. These registers include a reorder register 15a, a current register 15b, a field delay register 15c, and a display register 15d. The bank address 25 is the address of the bank in the frame buffer 13 in which a decoded picture is stored.

The display control section 15 receives a sequence layer decode completion notice 26 and a GOP layer decode completion notice 27 from the image decoding section 12. The sequence layer decode completion notice 26 is issued at a point of time when the decoding of the parameters of the sequence layer has been finished. The GOP decode completion notice 27 is issued at a point of time when the decoding of the parameters of the GOP layer has been finished.

The display control section 15 is supplied with the vertical synchronization signal (V-Sync) 21 from the vertical synchronization signal generator 16. The display control section 15 outputs a display starting instruction 28 to the frame buffer 13 at a timing synchronous with the vertical synchronization signal (V-Sync) 21. Based on this display starting instruction 28, the frame buffer 13 transfers a predetermined picture to a display unit not shown, and the display unit displays the image.

As explained above, the MPEG video decoder starts the decoding of a bit stream for one picture at a timing synchronous with the vertical synchronization signal (V-Sync) 21, and transfers the picture to the display unit at a timing synchronous with the vertical synchronization signal (V-Sync) 21. Thus, the image displayed by the display unit is updated at the timing synchronous with the vertical synchronization signal (V-Sync) 21, and the display unit displays a dynamic image.

Figure 3:
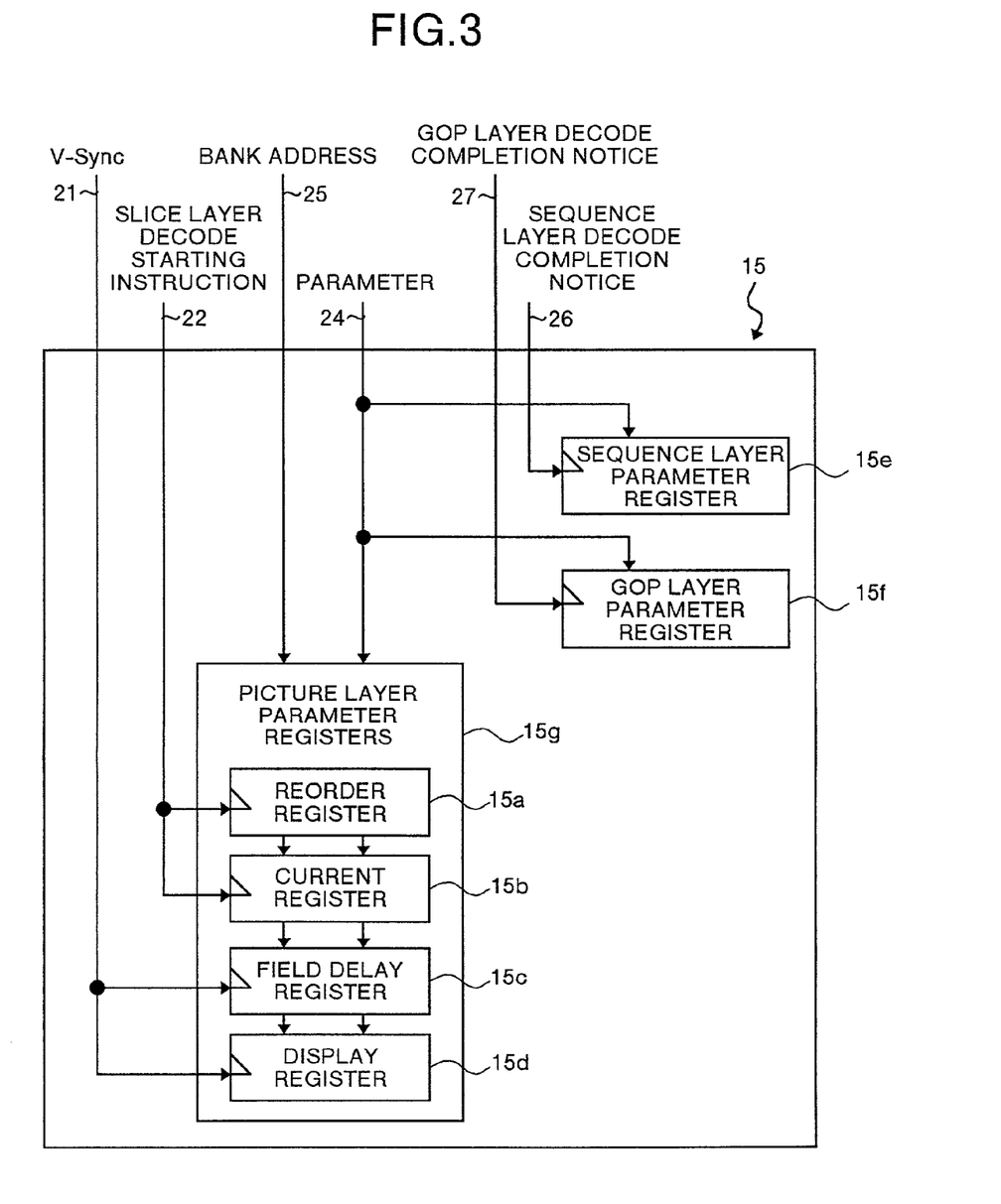
FIG. 3 is a block diagram that shows a structure of a register of the conventional MPEG video decoder.

FIG. 3 is a diagram that shows a structure of the registers within the display control section 15. The display control section 15 is provided with a sequence layer parameter register 15e, a GOP layer parameter register 15f, and picture layer parameter registers 15g. When the sequence layer parameter register 15e has received the sequence layer decode completion notice 26, the sequence layer parameter register 15e stores the parameters of the horizontal size value and the vertical size value of the sequence layer out of the parameters 24 of each layer.

When the GOP layer parameter register 15f has received the GOP layer decode completion notice 27, the GOP layer parameter register 15f stores the parameters of the closed group of picture and the broken link of the GOP layer out of the parameters 24 of each layer. The picture layer parameter registers 15g include the reorder register 15a, the current register 15b, the field delay register 15c, and the display register 15d described above.

Parameters that are stored in the picture layer parameter register group 15g include a temporal reference, a picture coding type, and a picture structure of the picture layer respectively, out of the parameters 24 of each layer. The picture layer parameter register group 15g stores the bank address 25.

The reason why there are four registers 15a, 15b, 15c and 15d for storing the picture layer display parameters and the bank address 25 is that, according to the MPEG standard, it is necessary to reorder the I picture, the P picture and the B picture. In other words, as mentioned above for decoding the B picture, the past and future pictures are referred. Therefore, it is necessary to reorder the pictures in order to process the future picture first.

The reorder register 15a stores the picture layer parameters and the bank address 25 of the I picture and the P picture respectively. The I picture and the P picture are not displayed straight when the decoding of these pictures has been completed. It is necessary to reorder these pictures with the B picture. Therefore, the parameters and the bank address 25 of the I picture and the P picture respectively are once saved in the reorder register 15a.

The current register 15b stores the picture layer display parameter of the picture to be displayed and the bank address 25. As the B picture is displayed immediately after the completion of the decoding, the parameters and the bank address 25 of the B picture are not stored in the reorder register 15a but are stored directly in the current register 15b.

The field delay register 15c delays the bank address 25 transferred from the current register 15b by one field time in order to set the decoding time to one frame time, and then transfers the delayed result to the next display register 15d. If it is assumed that the field delay register 15c is not present, then the field slot of the display timing becomes the field slot immediately after the field slot of the decoding timing. As a result, it is not possible to perform the display at the right timing. The data that is stored in the field delay register 15c is only the bank address 25.

The display register 15d stores the bank address 25 of the picture currently being displayed. In other words, the display control section 15 issues the display starting instruction 28 so that a picture indicated by the bank address 25 stored in the display register 15d is displayed. The data stored in the display register 15d is only the bank address 25, and the display register 15d takes in the content of the display register 15c as it is. The display control section 15 executes the display of the picture by comprehensively analyzing the display parameter of the picture layer stored in this register and the parameters of the sequence layer and the parameters of the GOP layer.

These four registers 15a to 15d have a shift register structure as shown in FIG. 3. The shift pulse of the reorder register 15a and the current register 15b is the slice layer decode starting instruction 22, and the shift pulse of the field delay register 15c and the display register 15d is the vertical synchronization signal (V-Sync) 21. The bank address 25 shifts to all the registers from the reorder register 15a to the display register 15d, but the display parameter of the picture layer shifts only up to the current register 15b.

The operation of the MPEG video decoder having the above-described conventional structure will be explained next. The time chart shown in FIG. 4 explains the operation of the conventional MPEG video decoder. In the example shown in FIG. 4, it is assumed that a bit stream is input in the order of an I picture I2, a B picture B0, a B picture B1, a P picture P5, a B picture B3, a B picture B4, and so on, and that the pictures are displayed in the order of the picture B0, the picture B1 the picture I2, the picture B3, and so on.

Figure 4:
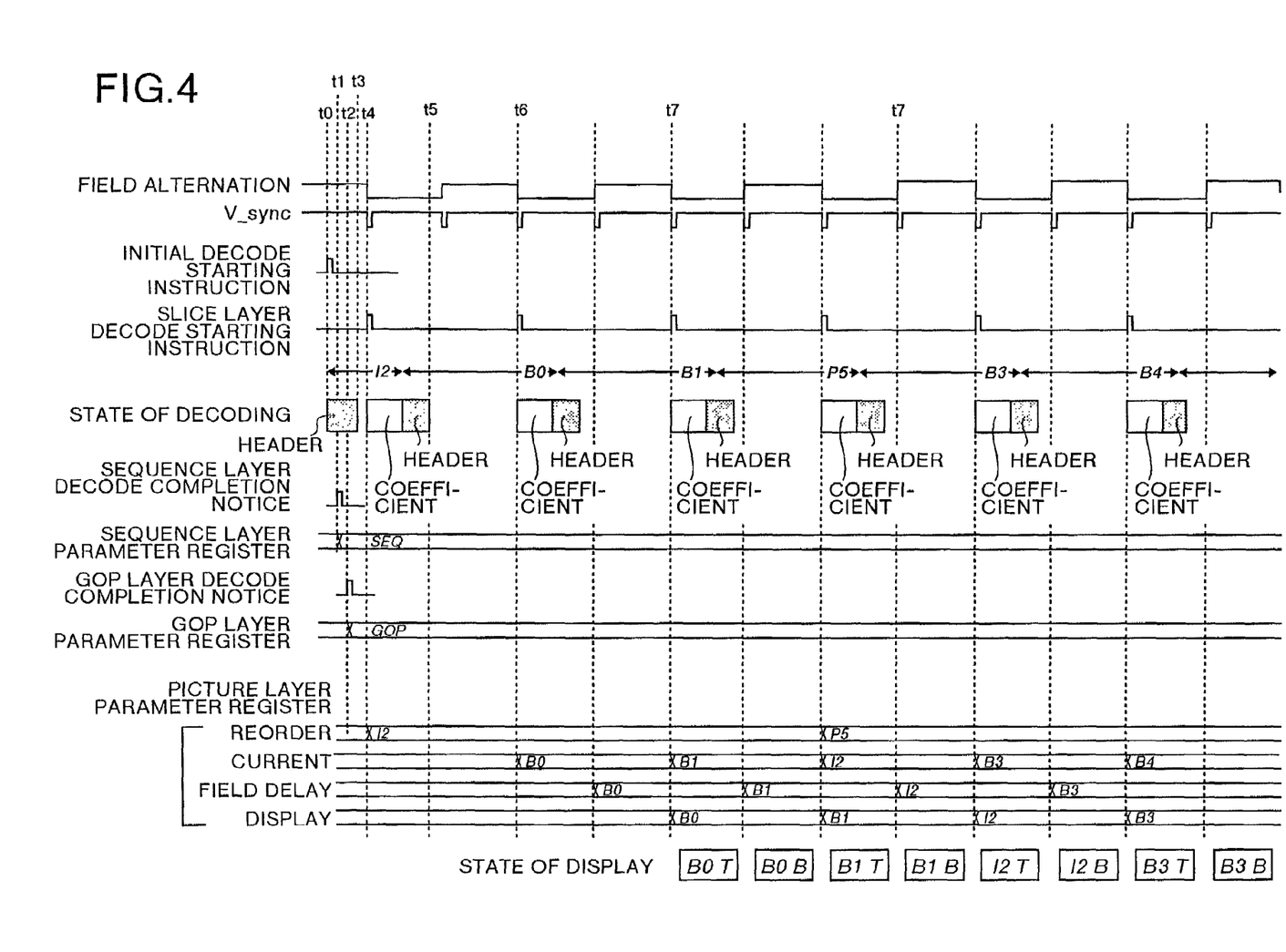
FIG. 4 is a time chart for explaining the operation of the conventional MPEG video decoder.

The MPEG bit stream obtained through the transmission path or the storing medium is first stored in the buffer memory 11. When a certain amount of data (for example, data for one picture) has accumulated in the buffer memory 11, the decode control section 14 issues the initial decode starting instruction 23 (at time t0). When the image decoding section 12 has received the initial decode starting instruction 23, the image decoding section 12 starts the decoding of the bit stream, and first carries out the decoding of a first picture. When the image decoding section 12 has finished the decoding of all the parameters of the sequence layer, the image decoding section 12 issues the sequence layer decode completion notice 26. When the display control section 15 has received the sequence layer decode completion notice 26, the display control section 15 stores the parameters of the sequence layer in the sequence layer parameter register 15e (at time t1).

Next, the image decoding section 12 carries out the decoding of the parameters of the GOP layer. When the image decoding section 12 has finished the decoding of the parameters of the GOP layer, the image decoding section 12 issues the GOP layer decode completion notice 27. When the display control section 15 has received the GOP layer decode completion notice 27, the display control section 15 stores the parameters of the GOP layer in the GOP layer parameter register 15f (at time t2). Further, the image decoding section 12 decodes the parameters of the picture layer of the picture I2 and reads the decoded parameters, and then halts temporarily (at time t3).

Thereafter, in synchronism with the pulse of the vertical synchronization signal (V-Sync), the decode control section 14 issues the slice layer decode starting instruction 22 (at time t4). When the image decoding section 12 has received the slice layer decode starting instruction 22, the image decoding section 12 decodes the slice layer and the MB (macro block) layer of the picture I2. When the decoding of the MB layer has been completed, the image decoding section 12 decodes the picture layer of the next picture B0. When the decoding of the picture layer of the picture B0 has been completed, the image decoding section 12 halts temporarily again (at time t5).

In the mean time, at time t4, the display control section 15 receives the picture parameter of the picture I2 from the image decoding section 12, and stores the picture parameter in the reorder register 15a. In this case, the reorder register 15a stores the parameters of the picture I2 at a timing synchronous with the slice layer decode starting instruction 22 using the slice layer decode starting instruction 22 as a latch pulse.

At time t6, the decode control section 14 issues the slice layer decode starting instruction 22 again in synchronism with the vertical synchronization signal (V-Sync) 21. When the image decoding section 12 has received this slice layer decode starting instruction 22, the image decoding section 12 starts the decoding of the slice layer and the MB layer of the picture B0. At the same time, the image decoding section 12 stores the picture parameter of the picture B0 into the current register 15b.

The picture parameter of the picture B0 is shifted to the field delay register 15c in synchronism with the vertical synchronization signal (V-Sync) 21, and is further stored in the display register 15d in synchronism with the next vertical synchronization signal (V-Sync) 21 (at time t7). Thus, the data of the pictures to be displayed have been arranged, and the pictures are ready for display. Then, the display control section 15 comprehensively analyzes the display layer parameters, the sequence layer parameters, and the GOP layer parameters, and determines how to display this B0.

Assume, for example, that the horizontal size value is "720", the vertical size value is "480", the value of the closed group of picture is "1", the value of the broken link is "0 (zero)", the value of the top field first is "1", the value of the repeat first field is "0 (zero)", and the values of the frame center horizontal offset and the frame center vertical offset are both "0 (zero)". In this case, the display control section 15 makes a decision that as the picture B0 is effective, this picture is displayed, and that the display is carried out in an ordinary manner instead of carrying out a pan-scan display in the pixel size of "720×480".

Thereafter, the display control section 15 issues the display starting instruction 28 to the frame buffer 13, and makes the picture displayed in the region shown by the horizontal size value and the vertical size value.

Thereafter, the image decoding section 12 carries out the decoding sequentially in a similar manner. For making a display of the B picture, the display control section 15 progresses the display by referring to the display parameter of the picture layer stored in the current register 15b and the display parameters of the sequence layer and the GOP layer. Further, for making a display of the I picture or the P picture, the display control section 15 progresses the display by referring to the display parameter of the picture layer stored in the display register 15d and the display parameters of the sequence layer and the GOP layer.

In the television image according to the NTSC (National Television System Committee) system, one frame is divided into two fields (a top field and a bottom field). Therefore, in FIG. 4 (as well as in FIG. 5, FIG. 7 and FIG. 8), each picture is shown by being divided into the top field (a field indicated by "T" in the drawing) and the bottom field (a field indicated by "B" in the drawing).

However, according to the above-described conventional MPEG video decoder, when a bit stream has only one picture in one sequence and also when the bit stream having a plurality of these sequences connected together (generally called a slide show) is to be decoded and displayed, the following two problems arise. These problems will be explained next.

Figure 5:
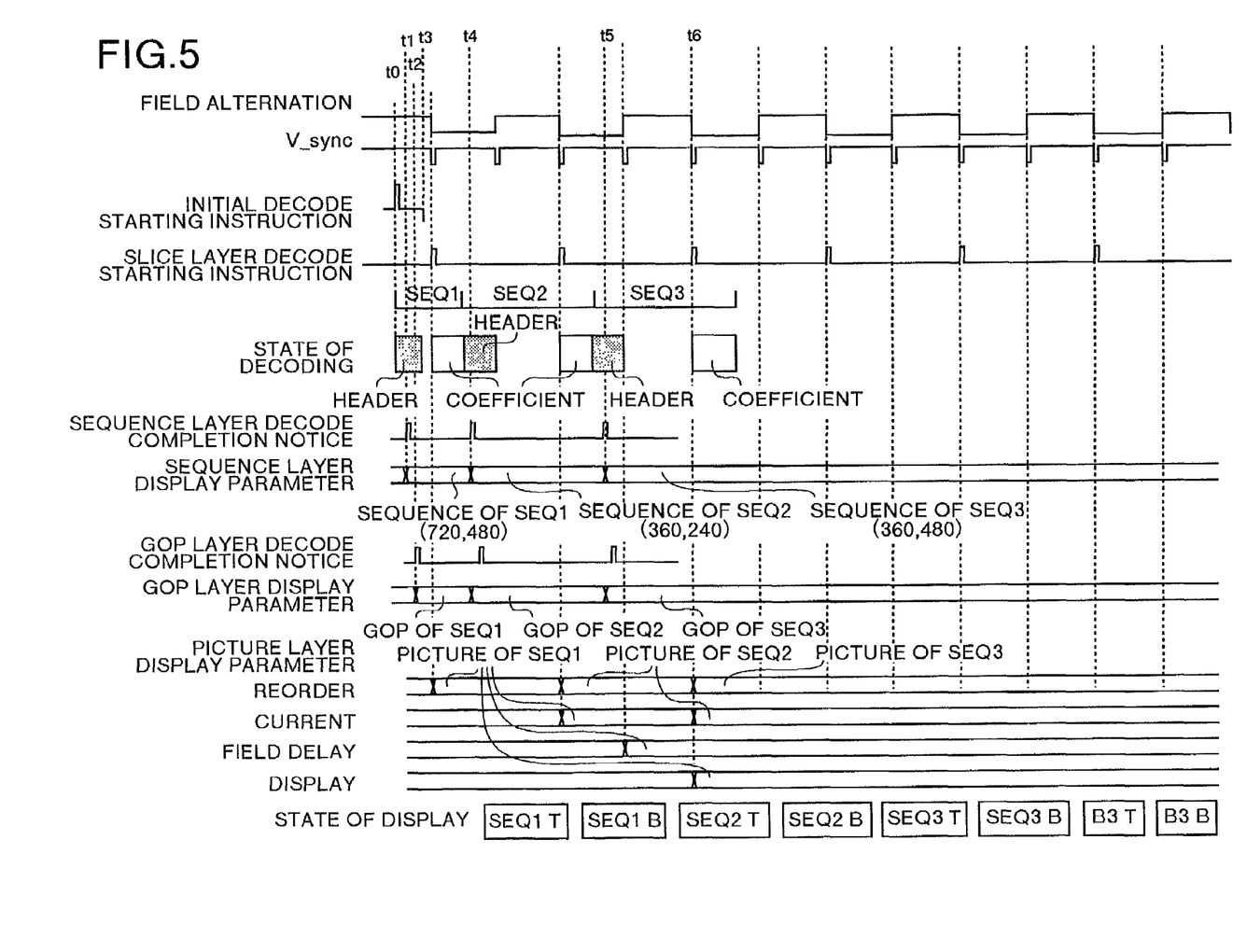
FIG. 5 is a time chart for explaining the operation in a slide show of the conventional MPEG video decoder.

The time chart shown in FIG. 5 explains the operation in a slide show of the conventional MPEG video decoder. A case where three sequences are connected together, each sequence having one picture, will be explained as an example. The three sequences will be called SEQ1, SEQ2 and SEQ3. In this case, as one sequence has one picture, a display parameter of the sequence layer exists in each of the three pictures.

Assume that the first sequence SQ1 has a value of "720" for the horizontal size value and a value of "480" for the vertical size value, the second sequence SQ2 has a value of "360" for the horizontal size value and a value of "240" for the vertical size value, and the third sequence SQ3 has a value of "360" for the horizontal size value and a value of "480" for the vertical size value.

In this case, as shown in FIG. 5, the operation from time t0 to t3 is the same as the operation of the normal display shown in FIG. 4. However, as shown in FIG. 5, the first sequence SEQ1 changes to the second sequence SEQ2 at time t4. Therefore, the sequence layer display parameter is updated from the parameter of the first sequence SEQ1 to the parameter of the second sequence SEQ2. In other words, the horizontal size of the image is updated from 720 pixels to 360 pixels, and the vertical size of the image is updated from 480 pixels to 240 pixels. Further, the second sequence SEQ2 is updated to the third sequence SEQ3 at time t5. At this point of time, the display parameter of the second sequence SEQ2 is updated to the display parameter of the third sequence SEQ3. Therefore, the vertical size of the image is updated from 240 pixels to 480 pixels. As a result, the sizes of the image are changed to "360×480" pixels.

In the case of displaying the I2 picture of the first sequence SEQ1 at time t6, the picture must be displayed in the sizes of "720×480" in principle. However, as the display parameter has been updated to the parameter of the third sequence at time t6, the I2 picture of the first sequence SEQ1 is displayed by the pixel sizes of "360×480". In other words, as the combination of the picture parameters and the sequence layers of the three sequences are not managed completely, the decoded images are not displayed correctly. Same thing can be said about the display parameter of the GOP layer though its explanation has been omitted. This is a first problem. This problem also occurs when a pause, a quick winding or a rewinding operation has been carried out for the MPEG bit stream that has been sent from the storing medium.

This problem occurs because only one register is provided for the sequence layer parameter register 15e and the GOP layer parameter register 15f respectively in the display control section 15. Therefore, only one set of the sequence parameters and the GOP parameters can be held in these registers 15e and 15f respectively. As a result, when different sequences continue like the slide show, the sequence parameters and the GOP parameters are overwritten and updated sequentially.

The second problem is that as there is no fourth sequence after the third sequence SEQ3, which is the last sequence of this slide show, the third sequence SEQ3 cannot be displayed. This is because when the slice layer decode starting instruction to the fourth sequence is not issued from the decode control section 14, the picture parameters of the third sequence SEQ3 stored in the reorder register 15a cannot be shifted to the current register 15b at time t6. When the picture parameters of the third sequence SEQ3 are not shifted to the current register 15b, the parameters are not shifted to the field delay register 15c and the display register 15d either. As a result, the third sequence SEQ3 is not displayed at all.

In order to decode and display the slide show by the MPEG video decoder having the above-described conventions structure, it is necessary to add in advance an additional sequence to the end of the last sequence, and to take a sufficiently long time between the sequences in order to avoid the overwriting of the parameters stored in the sequence layer parameter register 15e and the GOP layer parameter register 15f respectively. However, based on this arrangement, it is not possible to completely achieve the display of the slide show.

SUMMARY OF THE INVENTION

It is an object of the present invention to provide an MPEG video decoder and an MPEG video decoding method capable of making a correct display in the MPEG bit stream such as a slide show even if there is no continuing pictures (or sequences).

It is another object of the present invention to provide an MPEG video decoder and an MPEG video decoding method capable of making a display of pictures in an optional order regardless of the original display order.

According to one aspect of the present invention, a decoded picture and parameters of a sequence layer, a GOP layer and a picture layer respectively for displaying the decoded picture are stored as a set in each bank of a frame memory. The parameters of each layer that are stored as a set with a picture to be decoded are generated by decoding the parameters attached to the picture to be decoded and by updating the parameters of each layer stored as a set with the picture that has been decoded immediately before.

However, for carrying out the decoding of a first picture, parameters are read from a memory area that stores parameters of the sequence layer, the GOP layer and the picture area respectively that are attached to the picture to be decoded. The parameters and the picture are decoded regardless of the vertical synchronization signal. On the other hand, the decoded picture is displayed in synchronism with the vertical synchronization signal.

The parameters of each layer decoded by the image decoding section are once stored in an internal buffer of the image decoding section in a macro block unit, and are then written into the frame memory. Similarly, pictures that have been decoded by the image decoding section are once stored in the internal buffer of the image decoding section in a macro block unit, and are then written into the frame memory. In this case, the decoded parameters of each layer and the decoded pictures are transferred between the internal buffer and the frame memory via the same data transfer path.

According to the present invention, each bank of the frame memory stores a set of the decoded picture and the parameters of the sequence layer, the GOP layer and the picture layer respectively for storing the picture. Therefore, it is possible to continuously decode the bit stream like the slide show. Further, it is possible to display the pictures in an optional order.

Other objects and features of this invention will become apparent from the following description with reference to the accompanying drawings.

DESCRIPTION OF THE PREFERRED EMBODIMENTS

Figure 6:
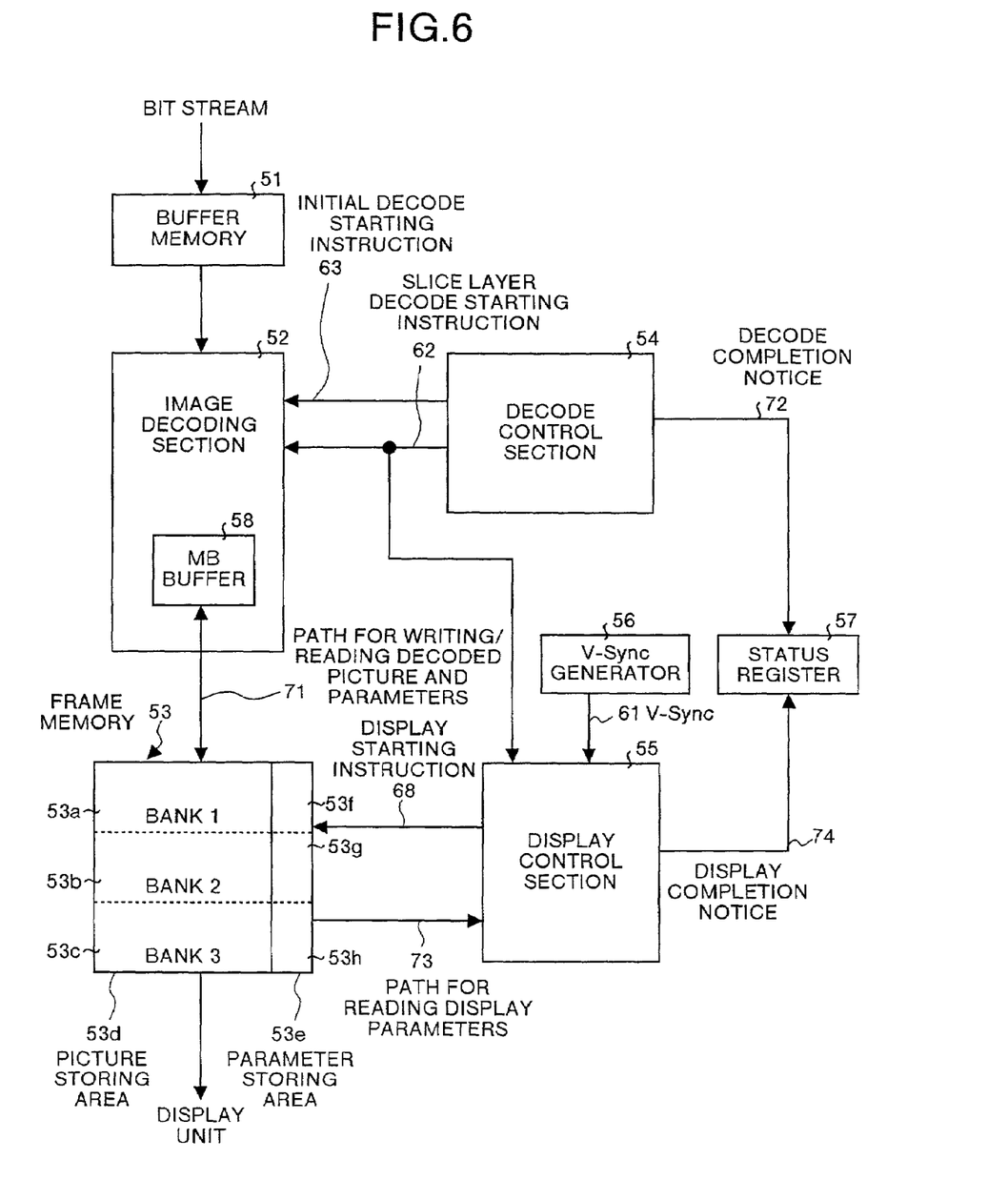
FIG. 6 is a block diagram that shows one example of a structure of an MPEG video decoder relating to the present invention.

One preferred embodiment of an MPEG video decoder relating to the present invention will be explained next with reference to the drawings. FIG. 6 is a block diagram that shows one example of a structure of the MPEG video decoder relating to the present invention. This MPEG video decoder includes a buffer memory 51, an image decoding section 52, a frame memory 53, a decode control section 54, a display control section 55, a vertical synchronization signal generator 56, and a status register 57.

The buffer memory 51 stores a bit stream of the MPEG obtained through a transmission path or from a storing medium. The image decoding section 52 decodes a bit stream transmitted from the buffer memory 51, and generates a picture and parameters of each layer. The image decoding section 52 has a macro-block buffer (hereinafter to be referred to as MB buffer) 58 as an internal buffer. The MB buffer 58 temporarily stores a decoded picture in a macro-block unit (8×8 pixels). Further, the MB buffer 58 temporarily stores decoded parameters.

The frame memory 53 stores a picture and parameters of each layer transferred from the MB buffer 58. In other words, the frame memory 53 is provided with a picture storing area 53d in which a decoded picture is stored and a parameter storing area 53e in which parameters of each layer are stored. The picture storing area 53d is divided into, for example, three picture banks 53a, 53b and 53c, although the number of the picture banks is not particularly limited. Similarly, the parameter storing area 53e is divided into, for example, three parameter banks 53f, 53g and 53h, although the number of the parameter banks is not particularly limited. The storage format of each of the parameter banks 53f, 53g and 53h is the same as that of the macro block (MB).

A decoded picture is stored in any one of the picture banks. Parameters attached to the stored picture are stored into a parameter bank corresponding to the storing bank of the picture among the three parameter banks 53f, 53g and 53h. For example, assume that the first parameter bank 53f corresponds to the first picture bank 53a. When a decoded picture of a picture I2 has been stored into the first picture bank 53a, all the parameters of the picture I2 are stored into the first parameter bank 53f. For example, the parameter banks 53f, 53g and 53h are provided in empty areas of the picture banks 53a, 53b and 53c respectively.

A data transfer path 71 between the MB buffer 58 and the frame memory 53 is a path for transferring a decoded picture from the MB buffer 58 to the frame memory 53. At the same time, the data transfer path 71 also works as a path for transferring parameters in two directions between the MB buffer 58 and the frame memory 53. In other words, parameters that have been stored in the MB buffer 58 are transferred to the parameter storing area 53e of the frame memory 53 via the data transfer path 71. Similarly, parameters that have been stored in the parameter storing area 53e are transferred to the MB buffer 58 via the data transfer path 71.

The status register 57 stores values corresponding to a data storage state of each bank of the frame memory 53. Three banks each are provided for pictures and for parameters in the frame memory 53, however, the number of banks is not particularly limited. In other words, as the frame memory 53 can store three sets of pictures and parameters, the status register 57 has three bits.

When a certain bank in the frame memory 53 stores a decoded picture and parameters corresponding to this picture, the value of the corresponding bit of the status register 57 becomes "1". On the other hand, the value of the bit of the status register 57 corresponding to an empty bank becomes "0". When a bank stores a picture of which display has already been finished, and also when this picture is not a reference picture of other picture, that is, when this picture is already unnecessary and this picture can be overwritten, the value of the bit of the status register corresponding to this bank becomes "0".

The bits of the status register 57 correspond to the third banks 53c and 53h, the second banks 53b and 53g, and the first banks 53a and 53f, in this order starting from the highest-order bit (MSB), for example. More specifically, when data are stored in all of the three banks 53a, 53b and 53c, the value of the status register is "111", and when all of these three banks are empty, the value of the status register 57 is "000".

The status register 57 plays the role of an arbitration function for arbitrating between the decode control section 54 and the display control section 55. In other word, the decode control section 54 and the display control section 55 observe the status register 57, and carry out decoding or display according to the value of the status register 57.

The decode control section 54 issues a slice layer decode starting instruction 62 to the image decoding section 52 and the display control section 55. The issue timing of the slice layer decode starting instruction 62 is not related to a vertical synchronization signal (V-Sync) 61. When the capacity of the buffer memory 51 has satisfied a predetermined condition at the time of a cold starting, the decode control section 54 issues an initial decode starting instruction 63 to the decode control section 52. The timing of issuing the initial decode starting instruction 63 is not related to the vertical synchronization signal (V-Sync) 61. When the decoding of all the macro blocks of a picture under decoding has been finished, the decode control section 54 issues a decode completion notice 72 to the status register 57.

The display control section 55 is supplied with the vertical synchronization signal (V-Sync) 61 from the vertical synchronization signal generator 56. The display control section 55 reads all the parameters of a picture to be displayed from the corresponding parameter bank via a parameter transfer path 73. The timing of reading the parameters is related to the vertical synchronization signal (V-Sync) 61. Further, the display control section 55 issues a display starting instruction to the frame memory 53. Based on this display starting instruction 68, a desired picture is transferred to a display unit not shown in FIG. 6 from the frame memory 53, and the picture is displayed in the display unit. After the completion of the display, the display control section 55 issues a display completion notice 74 to the status register 57.

Figure 7:
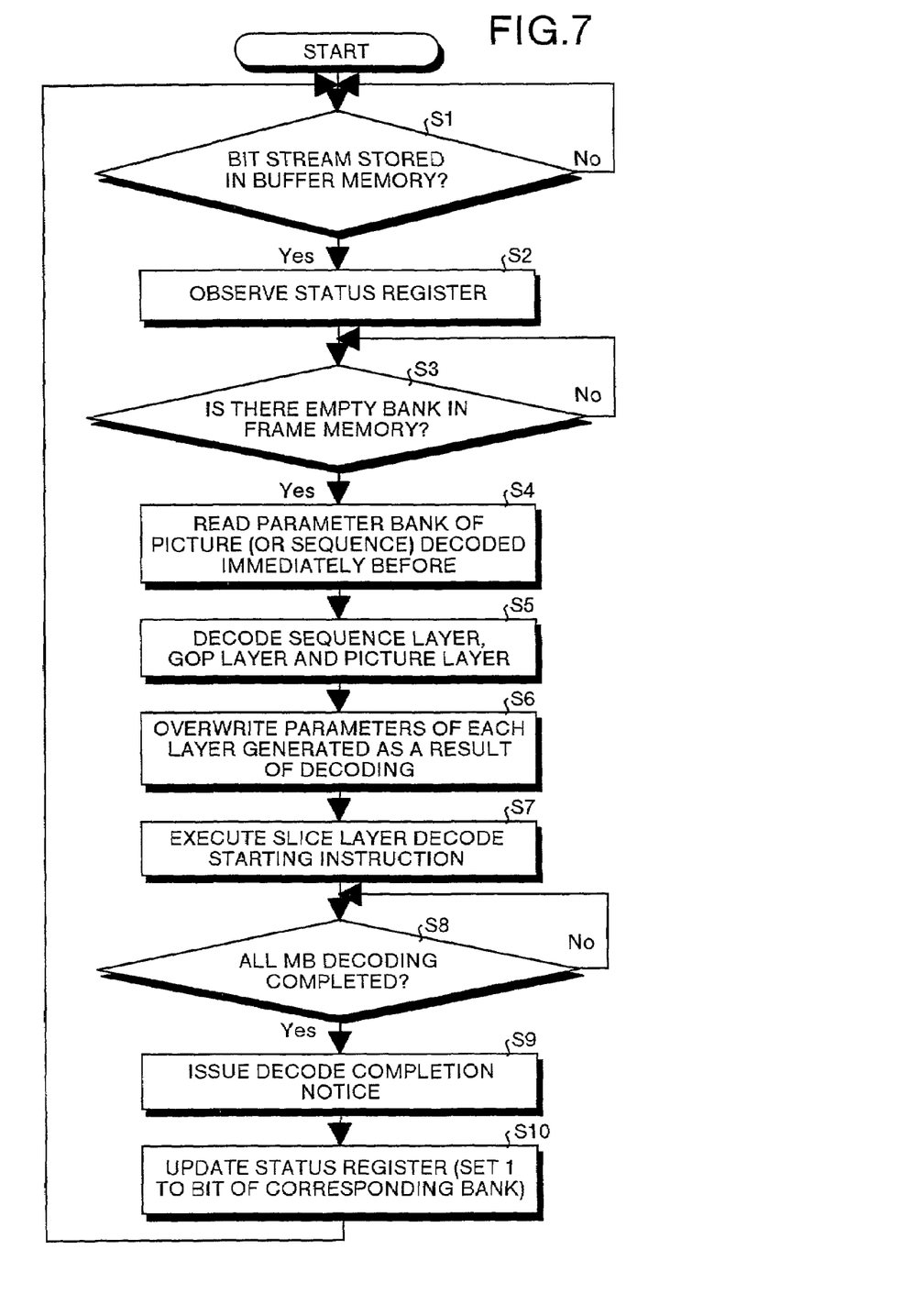
FIG. 7 is a flowchart that shows one example of a decode processing of the MPEG video decoder relating to the present invention.

A decode processing of the MPEG video decoder relating to the present invention will be explained next. FIG. 7 is a flowchart that shows one example of a decode processing of the MPEG video decoder relating to the present invention.

An MPEG bit stream obtained through a transmission path or from a storing medium is stored into the buffer memory 51. In starting a decoding, when a predetermined amount of MPEG bit stream (for example one picture component) has been stored into the buffer memory 51 (step S1), the decode control section 54 first observes the status register 57 (step S2). Then, the decode control section 54 makes a decision as to whether there is an empty bank in the frame memory 53 or not (step S3). When there is no empty bank, the decode control section 54 does not start the decoding, and waits until there is an empty bank.

When there is an empty bank, the decoding is started. The decode control section 54 reads out parameters relating to a picture (or a sequence) that has been decoded immediately before from the parameter bank that stores these parameters, and then the decode control section 54 stores the read-out parameters into the MB buffer 58 (step S4). However, when decoding a first picture of a series of MPEG bit stream, there is no picture that has been decoded immediately before. In other words, there is no parameter bank that stores parameters relating to a picture (or a sequence) that has been decoded immediately before.

Therefore, when decoding a first picture, parameters are read from a bank that is scheduled to store the parameters relating to this picture when the decoding of this picture has been finished in future. At a first decoding time, the bank that is scheduled to store the parameters in future is in the initial state, that is, in the state that nothing has been written in this bank. Therefore, "0" is written into all the banks of the MB buffer 58.

Then, the image decoding section 52 decodes the sequence layer, the GOP layer and the picture layer relating to the picture to be decoded (step S5). When there is no data in the sequence layer and the GOP layer, only the picture layer is decoded. Parameters of each layer that have been generated as a result of the decoding are overwritten into the parameters stored in the MB buffer 58 (step S6). Then, the parameters are transferred from the MB buffer to the parameter bank, and are written into this parameter bank.

When the parameters relating to the picture to be decoding have been written into the parameter bank, the decode control section 54 issues the slice layer decode starting instruction 62 (step S7). After the slice layer decode starting instruction 62 has been issued, the decoding of the slice layer and the MB layer of the picture to be decoded is started. The decoded data are once stored into the MB buffer 58, and then written into the picture bank of the frame memory 53 in the macro-block unit.

When the decoding of all the macro-blocks relating to the picture under decoding has been finished (step S8), the decode control section 54 issues the decode completion notice 72 to the status register 57 (step S9). Based on this decode completion notice 72, the value of the bit of the status register 57 corresponding to the bank of the frame memory 53 in which the decoded picture and parameters are stored is changed from "0" to "1" (step S10). Thereafter, the process returns to the first step, and the processing at step S1 to step S10 is repeated.

Figure 8:
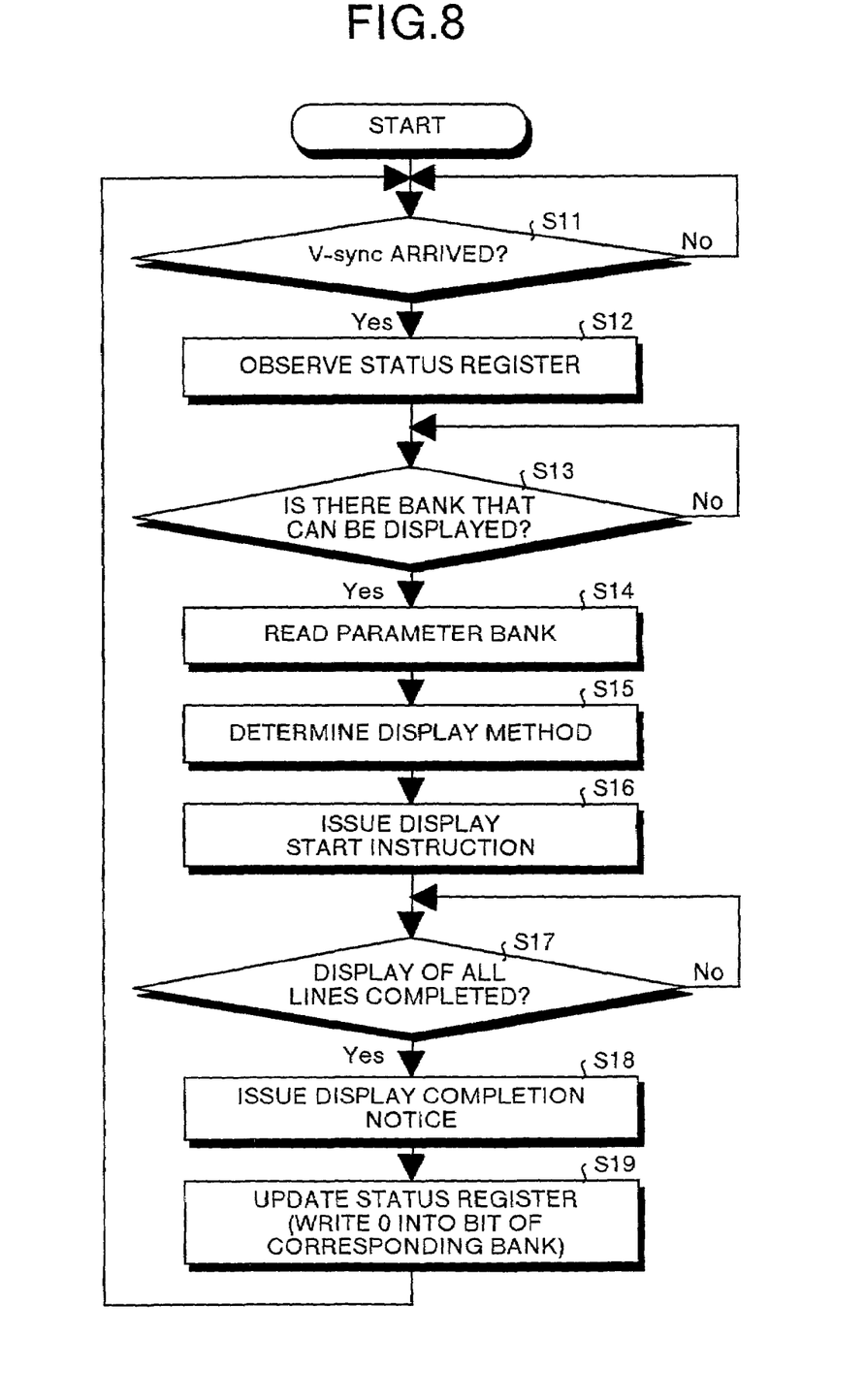
FIG. 8 is a flowchart that shows one example of a display processing of the MPEG video decoder relating to the present invention.

A display processing of the MPEG video decoder relating to the present invention will be explained next. The flowchart in FIG. 8 shows one example of the display processing of the MPEG video decoder relating to the present invention.

In synchronism with the fall of the vertical synchronization signal (V-Sync) 61 (step S11), the display control section 55 observes the status register 57 (step S12). The status register 57 makes a decision as to whether there is a picture that can be displayed within the frame memory 53 or not (step S13). When the value of any one of the bits of the status register 57 is "1", this means that there is a picture that can be displayed within the frame memory 53.

When there is a picture that can be displayed, the display control section 55 reads out all the parameters of the picture to be displayed from the corresponding parameter bank (step S14). The display control section 55 analyzes the content of the parameters that have read, and determines how to display this picture (step S15). Then, the display control section 55 issues a display starting instruction 68 (step S16). Based on this display starting instruction 68, a desired picture is transferred from the frame memory 53 to a display unit not shown, and this picture is displayed in the display unit.

When the display of all the lines of the picture has been finished (step S17), the display control section 55 issues a display completion notice 74 to the status register 57 (step S18). Based on the issuing of this display completion notice 74, when the displayed picture is not a reference frame, the value of the corresponding bit of the status register 57 is written from "1" to "0" (step S19). However, when the displayed picture is a reference frame, the value of the corresponding bit is kept at "1". Thereafter, the process returns to the first step, and the processing from step S11 to S19 is repeated.

Figure 9:
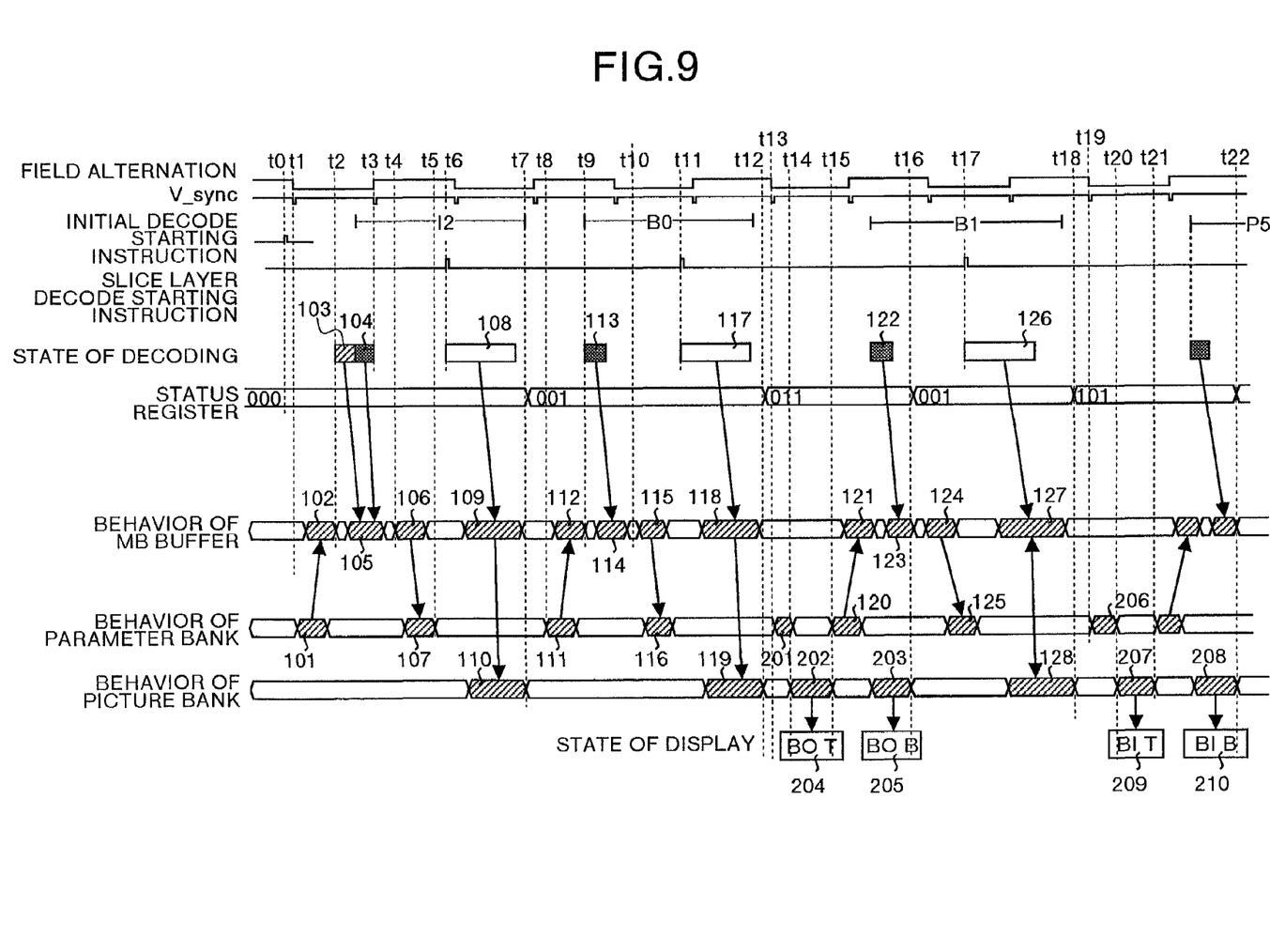
FIG. 9 is a time chart that shows operation timings during a normal operation of the MPEG video decoder relating to the present invention.

Next, normal operation of the MPEG video decoder relating to the present invention will be explained. The time chart in FIG. 9 shows operation timings during a normal operation of the MPEG video decoder relating to the present invention. The normal operation in this case refers to the operation of decoding a series of MPEG bit stream in the original order. Therefore, such operations as a slide show, a quick winding or rewinding, and an inverse reproduction are not included.

When the initial decode starting instruction 63 has been issued at time t0, the decode control section 54 first observes the status register 57. As the status register 57 is at the initial state, the value of the status register 57 is "000". Therefore, the picture I2 is decoded using, for example, the first banks 53a and 53f of the frame memory 53.

As the picture I2 is the first picture, there is no picture that has been decoded in this straight line. Therefore, at time t0, all the parameters are read from the first parameter bank 53f (legend 101 in FIG. 9), and these parameters are written into the MB buffer 58 (legend 102 in FIG. 9). In this case, as nothing has yet been written into the first parameter bank 53f, "0" is written into all the parameters of the MB buffer 58. The reason why the parameters are read from the first parameter bank 53f at the beginning is as explained previously.

At time t2, the writing of the content of the first parameter bank 53f into the MB buffer 58 has been finished. At the same time, the decoding of the bit stream is started, and the sequence layer and the GOP layer are decoded (legend 103 in FIG. 9). Subsequently, the picture layer of the picture I2 is decoded (legend 104 in FIG. 9). The parameters obtained as a result of the decoding are sequentially written into the MB buffer 58 while forming the parameters into a format that can be stored into the MB buffer 58 (legend 105 in FIG. 9). When the decoding of the picture layer has been finished at time t3, the decoding is halted temporarily.

After the writing of the parameters into the MB buffer 58 has been finished, the parameters are read out from the MB buffer 58 at times t4 to t5 (legend 106 in FIG. 9). Then, the read-out parameters are written into the first parameter bank 53f (legend 107 in FIG. 9). All the parameters of the picture I2 have been stored into the first parameter bank 53f by this time.

At time t6, the decode control section 54 issues the slice layer decode starting instruction 62. Then, the image decoding section 52 decodes the slice layer and the MB layer of the picture I2 at times t6 and t7 (legend 108 in FIG. 9) In this case, decoding is carried out for each one macro-block. Coefficient data generated as a result of the decoding are accumulated into the MB buffer 58 (legend 109 in FIG. 9). Then, the slices are sequentially written into the first picture bank 53a in the macro-block unit (legend 110 in FIG. 9).

When all the slices have been written into the first picture bank 53a at time t7, "1" is written into the lowest-order bit (LSB) of the status register 57. Therefore, the value of the status register 57 becomes "001". The decoding of the picture I2 has been completed by this time.

Thereafter, at time t8, the decode control section 54 observes the value of the status register 57 again. As the value of the status register 57 is "001", the picture B0 is decoded using, for example, the second banks 53b and 53g of the frame memory 53. Therefore, all the parameters of the picture I2 that has been decoded immediately before are read from the first parameter bank 53f (legend 111 in FIG. 9). The read-out parameters are then written into the MB buffer 58 (legend 112 in FIG. 9).

As the picture I2 and the picture B0 are the pictures that are included in the same sequence, only the parameters of the picture layer exist in the picture B0. In other words, the parameters of the sequence layer and the GOP layer do not exist in the picture B0. Therefore, in order to obtain parameters corresponding to the parameters of the sequence layer and the GOP layer of the picture B0, the parameters of the sequence layer and the GOP layer of the picture included in the same sequence are necessary. For this purpose, the parameters of the picture (the picture I2 in this case) decoded immediately before are read out in the present embodiment.

When all the parameters of the picture I2 have been written into the MB buffer 58 at time t9, the decoding of the picture B0 is started (legend 113 in FIG. 9). As the picture B0 starts with the data of the picture layer, the parameters of the sequence layer and the GOP layer stored in the MB buffer 58 are left as they are, and only the decoded picture layer parameters are overwritten into the MB buffer 58 (legend 114 in FIG. 9).

When the writing of the parameters into the MB buffer 58 has been finished at time t10, the parameters are read out from the MB buffer 58 (legend 115 in FIG. 9). The read-out parameters are written into the second parameter bank 53g (legend 116 in FIG. 9). All the parameters of the picture B0 have been stored into the second parameter bank 53g by this time.

At time t11, the decode control section 54 issues the slice layer decode starting instruction 62. Thus, the image decoding section 52 decodes the slice layer and the MB layer of the picture B0 at times t11 to t12 (legend 117 in FIG. 9). The image decoding section 52 then accumulates the coefficient data into the MB buffer 58 (legend 118 in FIG. 9), and sequentially writes the coefficient data into the second picture bank 53b (legend 119 in FIG. 9).

When the writing of all the slices into the second picture bank 53b has been finished at time t12, "1" is written into the center bit of the status register 57. Therefore, the value of the status register 57 becomes "011". The decoding of the picture B0 has been completed by this time.

The picture B1 is also decoded in a similar manner. As the value of the status register 57 at time t15 is "011", the decoding of the picture B1 is carried out using the third banks 53c and 53h of the frame memory 53. All the parameters of the picture B0 decoded immediately before are read out (legend 120 in FIG. 9), and the parameters are written into the MB buffer 58 (legend 121 in FIG. 9). The picture layer of the picture B1 is decoded (legend 122 in FIG. 9), and the picture layer parameters of the picture B1 are overwritten into the MB buffer 58 (legend 123 in FIG. 9). The parameters are read from the MB buffer 58 (legend 124 in FIG. 9), and the parameters are written into the third parameter bank 53h (legend 125 in FIG. 9). Through the above series of operation, all the parameters of the picture B1 are stored into the third parameter bank 53h.

When the slice layer decode starting instruction 62 has been issued at time t17, the slice layer and the MB layer of the picture B1 are decoded (legend 126 in FIG. 9), the coefficient data are accumulated into the MB buffer 58 (legend 127 in FIG. 9), and the coefficient data are transferred from the MB buffer 58 into the third picture bank 53c (legend 128 in FIG. 9). Through the series of the above operation, all the slices of the picture B1 are written into the third picture bank 53c. Thereafter, "1" is written into the highest-order bit (MSB) of the status register 57. The decoding of the picture P5 afterward is carried out in a similar manner.

In the mean time, the display control section 55 observes the status register 57 at the fall of the vertical synchronization signal (V-Sync) 61. The value of the status register 57 at time t13 is "011". Thus, as the value of the center bit corresponding to the second banks 53b and 53g is "1", it can be understood that the picture B0 to be displayed first is stored in the second banks 53b and 53d, and the picture B0 can be displayed.

Therefore, at time t13, the display control section 55 reads out the parameters of the picture B0 from the second parameter bank 53g (legend 201 in FIG. 9). Then, the display control section 55 analyzes the read-out parameters, and determines how to display the picture. During the period from time t14 to t16, the display control section 55 reads out the decoded picture of the picture B0 from the second picture bank 53b (legends 202 and 203 in FIG. 9), and makes the picture to be displayed in the display unit (legends 204 and 205 in FIG. 9). Thereafter, the display control section 55 writes "0" into the center bit of the status register 57. In FIG. 9, the legends 204 and 205 denote a top field and a bottom field of the picture B0 respectively.

The picture B1 is also displayed in a similar manner. At the fall timing of the vertical synchronization signal (V-Sync) 61 at time t19, the value of the status register 57 is "101". Therefore, it can be understood that the third banks 53c and 53h store the picture B1 that is to be displayed at a second time, and the picture B1 can be displayed.

Therefore, the display control section 55 reads out the parameters of the picture B1 at time t19 (legend 206 in FIG. 9), and makes a decision as to how to display the picture. During the period from time t2 to t22, the display control section 55 reads out the decoded picture of the picture B1 (legends 209 and 210 in FIG. 9), and makes the picture displayed in the display unit (legends 209 and 210 in FIG. 9). Thereafter, "0" is written into the highest-order bit (MSB) of the status register 57. The decoding and the display of the picture in the normal operation are proceeded in the above-described manner.

Next, the operation in the slide show of the MPEG video decoder relating to the present invention will be explained. The operation in the slide show is basically the same as that in the above-described normal operation, except that the parameters of the sequence layer and the GOP layer attached to each one picture are written into the MB buffer 58. The time chart in FIG. 10 shows operation timings in a slide show of the MPEG video decoder relating to the present invention.

When the initial decode starting instruction 63 has been issued at time t0, the decode control section 54 first observes the status register 57. As the status register 57 is at the initial state, the value of the status register 57 is "000". Therefore, the first sequence SEQ1 is decoded using, for example, the first banks 53a and 53f of the frame memory 53.

Figure 10:
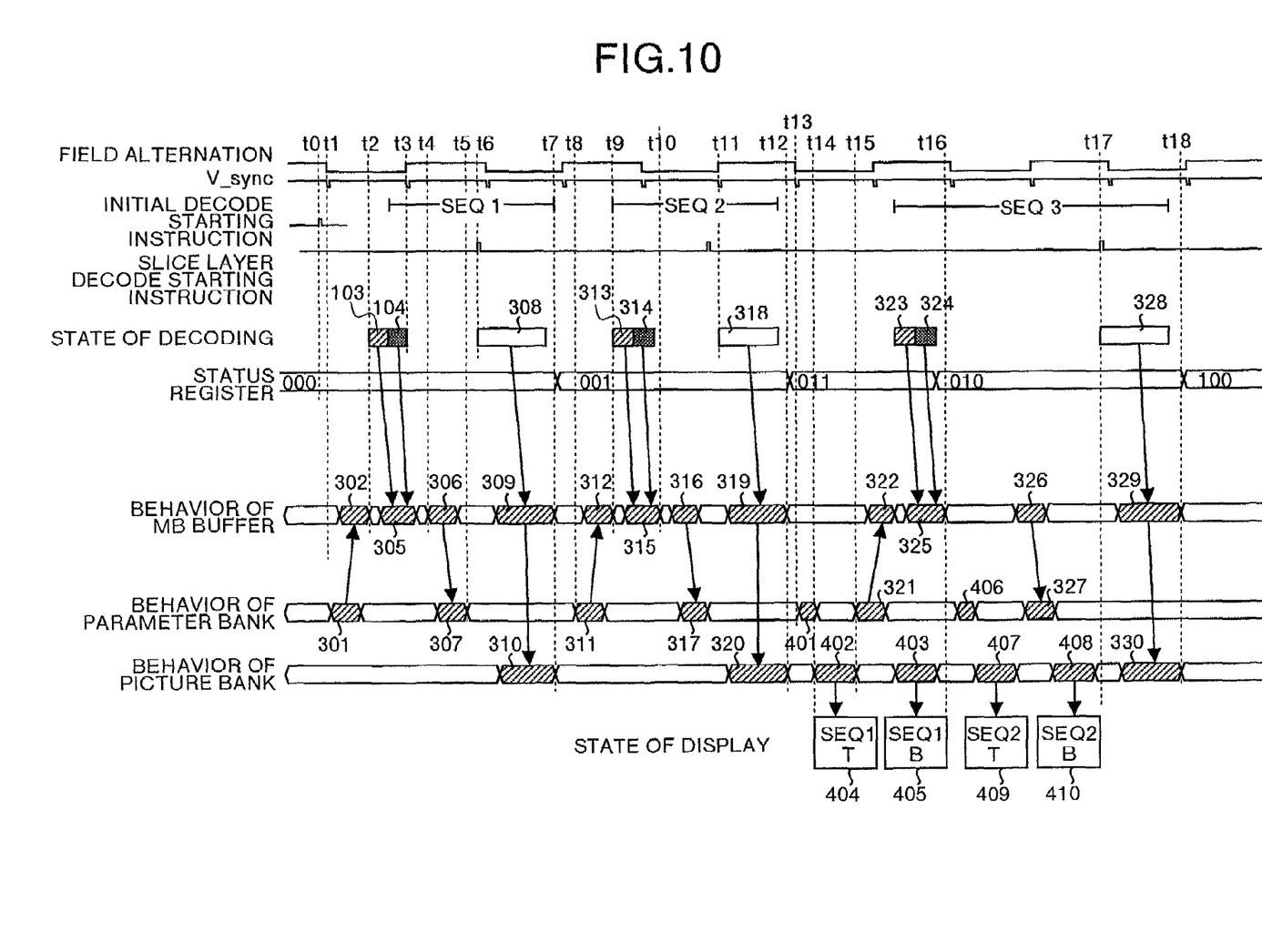
FIG. 10 is a time chart that shows operation timings in a slide show of the MPEG video decoder relating to the present invention.

At time t0, all the parameters are read from the first parameter bank 53f (legend 301 in FIG. 10), and these parameters are written into the MB buffer 58 (legend 302 in FIG. 10). In the slide show, the sequence layer and the GOP layer are attached to each one picture. Therefore, a series of the read operation for reading these parameters and the write operation for writing these parameters into the MB buffer 58 are not necessary in principle. However, as the slide show is executed by the operation similar to that in the normal operation, the series of operations are also executed in the slide show.

At time t2, the writing of the content of the first parameter bank 53f into the MB buffer 58 has been finished. At the same time, the decoding of the bit stream is started, and the sequence layer and the GOP layer of the first sequence SEQ1 are decoded (legend 303 in FIG. 10). Subsequently, the picture layer of the first sequence SEQ1 is decoded (legend 304 in FIG. 10). The parameters obtained as a result of the decoding are sequentially written into the MB buffer 58 while forming the parameters into a format that can be stored into the MB buffer 58 (legend 305 in FIG. 10). When the decoding of the picture layer has been finished at time t3, the decoding is halted temporarily.

After the writing of the parameters into the MB buffer 58 has been finished, the parameters are read out from the MB buffer 58 at times t4 to t5 (legend 306 in FIG. 10). Then, the read-out parameters are written into the first parameter bank 53f (legend 307 in FIG. 10). All the parameters of the first sequence SEQ1 have been stored into the first parameter bank 53f by this time.

At time t6, the decode control section 54 issues the slice layer decode starting instruction 62. Then, the image decoding section 52 decodes the slice layer and the MB layer of the first sequence SEQ1 for each one macro-block at times t6 and t7 (legend 308 in FIG. 10). Coefficient data generated as a result of the decoding are accumulated into the MB buffer 58 (legend 309 in FIG. 10). Then, the slices are sequentially written into the first picture bank 53a in the macro-block unit (legend 310 in FIG. 10).

When all the slices have been written into the first picture bank 53a at time t7, "1" is written into the lowest-order bit (LSB) of the status register 57. Therefore, the value of the status register 57 becomes "001". The decoding of the first sequence SEQ1 has been completed by this time.

Thereafter, at time t8, the decode control section 54 observes the value of the status register 57 again. As the value of the status register 57 is "001", the second sequence SEQ2 is decoded using, for example, the second banks 53b and 53g of the frame memory 53. Therefore, the parameters of the first sequence decoded immediately before are read from the first parameter bank 53f (legend 311 in FIG. 10). The read-out parameters are then written into the MB buffer 58 (legend 312 in FIG. 10).

When all the parameters have been written into the MB buffer 58 at time t9, the decoding of the second sequence SEQ2 is started, and the sequence layer and the GOP layer are decoded (legend 313 in FIG. 10). Subsequently, the picture layer of the second sequence SEQ2 is (legend 314 in FIG. 10). The parameters of the decoded layers are overwritten into the MB buffer (legend 315 in FIG. 10).

When the writing of the parameters into the MB buffer 58 has been finished at time t10, the parameters are read out from the MB buffer 58 (legend 316 in FIG. 10). The read-out parameters are written into the second parameter bank 53g (legend 317 in FIG. 10). All the parameters of the second sequence SEQ2 have been stored into the second parameter bank 53g by this time.

At time t11, the decode control section 54 issues the slice layer decode starting instruction 62. Thus, the image decoding section 52 decodes the slice layer and the MB layer of the second sequence SEQ2 at times t11 to t12 (legend 318 in FIG. 10). The image decoding section 52 then accumulates the coefficient data into the MB buffer 58 (legend 319 in FIG. 10), and sequentially writes the coefficient data into the second picture bank 53b (legend 320 in FIG. 10).

When the writing of all the slices into the second picture bank 53b has been finished at time t12, "1" is written into the center bit of the status register 57. Therefore, the value of the status register 57 becomes "011". The decoding of the second sequence SEQ2 has been completed by this time.

The third sequence SEQ3 is also decoded in a similar manner. As the value of the status register 57 at time t15 is "011", the decoding of the third sequence SEQ3 is carried out using the third banks 53c and 53h of the frame memory 53.

All the parameters stored immediately before are read out (legend 321 in FIG. 10), and the parameters are written into the MB buffer 58 (legend 322 in FIG. 10). The sequence layer and the GOP layer of the third sequence SEQ3 are decoded (legend 323 in FIG. 10). The picture layer of the third sequence SEQ3 is decoded (legend 324 in FIG. 10). The parameters of each layer of the third sequence SEQ3 are overwritten into the MB buffer 58 (legend 325 in FIG. 10), and the parameters are read from the MB buffer 58 (legend 326 in FIG. 10). The parameters are written into the third parameter bank 53h (legend 327 in FIG. 10). Through the above series of operation, all the parameters of the third sequence SEQ3 are stored into the third parameter bank 53h.

When the slice layer decode starting instruction 62 has been issued at time t17, the slice layer and the MB layer of the third sequence SEQ3 are decoded (legend 328 in FIG. 10), the coefficient data are accumulated into the MB buffer 58 (legend 329 in FIG. 10), and the coefficient data are transferred from the MB buffer 58 into the third picture bank 53c (legend 320 in FIG. 10). Through the series of the above operation, all the slices of the third sequence SEQ3 are written into the third picture bank 53c. Thereafter, "1" is written into the highest-order bit (MSB) of the status register 57. When there are continuing sequences, the decoding of these sequences is carried out in a similar manner.

In the mean time, the display control section 55 observes the status register 57 at the fall of the vertical synchronization signal (V-Sync) 61. The value of the status register 57 at time t13 is "011". Therefore, it is determined that the picture of the first sequence SEQ1 is displayed. In the case of the slide show, all the pictures are intra-pictures. Therefore, they can be displayed anytime when their decoding has been completed. At time t13, it is possible to display the first sequence SEQ1 and the second sequence SEQ2.

At time t13, the display control section 55 reads out the parameters of the first sequence SEQ1 from the first parameter bank 53f (legend 401 in FIG. 10). As the first parameter bank 53f stores the sequence parameters and the GOP parameters of the first sequence SEQ1, it is possible to read out the value of the horizontal size value (for example, "720") and the value of the vertical size value (for example, "480").

The display control section 55 reads out the decoded pictures of the first sequence SEQ1 from the first picture bank 53a (legend 402 and 403 in FIG. 10), and makes the pictures to be displayed in the display unit (legend 404 and 405 in FIG. 10). Therefore, at times t14 to t16, the pictures of the first sequence SEQ1 can be displayed correctly as the parameters and the pictures are combined together correctly. Thereafter, the display control section 55 writes "0" into the lowest-order bit (LSB) of the status register 57.

The pictures of the second sequence SEQ2 are also displayed in a similar manner. At the fall timing of the vertical synchronization signal (V-Sync) 61 at time t19, the value of the status register 57 is "101". Therefore, it is determined that the pictures of the second sequence SEQ2 are displayed. The display control section 55 then reads out the parameters of the second sequence SEQ2 (legend 406 in FIG. 10). Then, the display control section 55 reads out the decoded pictures of the second sequence SEQ2 (legend 407 and 408 in FIG. 10), and makes the pictures displayed in the display unit (legend 409 and 410 in FIG. 10). Thereafter, "0" is written into the center bit of the status register 57. The decoding and the display of the pictures in the slide show are proceeded in the above-described manner.

According to the present embodiment, the picture banks 53a, 53b and 53c and the parameter banks 53f, 53g and 53h of the frame memory 53 store the decoded pictures and the parameters of the sequence layer, the GOP layer and the picture layer for displaying the pictures as a set respectively. Therefore, it is possible to continuously decode the pictures of the bit stream like the slide show. Further, as it is possible to display the pictures in a desired order, it is easily possible to reproduce the pictures in the opposite order. Further, it becomes easy to manage the pictures and display parameters in the frame memory 53.

The above description assumes MPEG2 as an example. However, it is also possible to apply the present invention to both the MPEG1 and the MPEG2.

In the present embodiment, the frame memory 53 has banks for three pictures. However, the number of banks is not limited to three, and it is also possible to provide banks for two picture or four pictures or above. Further, it is needless to mention that the MPEG video decoder relating to the present invention is not limited to the above-described embodiment, and the MPEG video decoder can be designed to have various modifications.

As explained above, according to the present invention, each bank of the frame memory stores a decoded picture and the parameters of the sequence layer, the GOP layer and the picture layer respectively for displaying this picture, as a set. Therefore, it is possible to continuously decode pictures of a bit stream like a slide show. Further, it is also possible to display the pictures in an optional order.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An MPEG video decoder for an MPEG bit stream which includes at least a sequence header, a first picture header immediately followed by first picture data, and a second picture header immediately followed by second picture data, wherein the first picture header, the second picture header, and the sequence header contain a first parameter, a second parameter, and a third parameter, respectively, the MPEG video decoder comprising:
   an image decoding section which decodes the MPEG bit stream;
   a frame memory which includes
   a first picture bank which stores first decoded picture data obtained by the image decoding section decoding the first picture data;
   a first parameter bank which is associated with the first picture bank and stores the first parameter and the third parameter obtained by the image decoding section from the first picture header and the sequence header, respectively;
   a second picture bank which stores second decoded picture data obtained by the image decoding section decoding the second picture data; and
   a second parameter bank which is associated with the second picture bank and stores the second parameter and the third parameter obtained by the image decoding section from the second picture header and the sequence header, respectively;
   a decode control section which controls the image decoding section; and
   a display control section which carries out a display control of the first decoded picture data stored in the first picture bank based on the first parameter and the third parameter stored in the first parameter bank, and carries out a display control of the second decoded picture data stored in the second picture bank based on the second parameter and the third parameter stored in the second parameter bank.

2. The MPEG video decoder according to clam 1, further comprising
   a status register which indicates a status of the first picture bank and the second picture bank, and wherein the decode control section updates the status register when any one of the first decoded picture data and the second decoded picture data is obtained, and the display control section updates the status register when any one of the first decoded picture data and the second decoded picture data is displayed.

3. The MPEG video decoder according to claim 2, wherein the display control section does not update the status register when a reference picture of other pictures is displayed.

4. The MPEG video decoder according to claim 1, wherein the image decoding section includes an internal buffer.

5. The MPEG video decoder according to claim 4, further comprising a data transfer path for transferring the first decoded picture data, the first parameter, the second decoded picture data, the second parameter, and the third parameter between the internal buffer and the frame memory.

6. The MPEG video decoder according to claim 4, wherein the image decoding section reads out the first parameter and the third parameter from the first parameter bank and transfers the same to the internal buffer, overwrites the first parameter in the internal buffer with the second parameter obtained by the image decoding section from the second picture header, and writes the second parameter and the third parameter in the internal buffer into the second parameter bank.

7. The MPEG video decoder according to claim 1, wherein the decode control section operates a synchronously with a vertical synchronization signal, and the display control section operates in synchronism with the vertical synchronization signal.

8. An MPEG video decoding method for an MPEG bit stream which includes at least a sequence header, a first picture header immediately followed by first picture data, and a second picture header immediately followed by second picture data, wherein the first picture header, the second picture header, and the sequence header contain a first parameter, a second parameter, and a third parameter, respectively, the MPEG video decoding method comprising:
   storing the first parameter and the third parameter obtained from the first picture header and the sequence header, respectively, into a first parameter bank in a frame memory;
   storing first decoded picture data obtained by decoding the first picture data into a first picture bank in the frame memory; reading the first parameter and the third parameter from the first parameter bank into a buffer;
   overwriting the first parameter in the buffer with the second parameter obtained from the second picture header;
   storing the second parameter and the third parameter in the buffer into a second parameter bank in the frame memory; and
   storing second decoded picture data obtained by decoding the second picture data into a second picture bank in the frame memory, wherein
   the first parameter bank is associated with the first picture bank, and
   the second parameter bank is associated with the second picture bank.

* * * * *